(12) United States Patent
Gaggero et al.

(10) Patent No.: US 10,839,667 B2
(45) Date of Patent: Nov. 17, 2020

(54) FIXING ELEMENT FOR ELECTRICAL DEVICES

(71) Applicant: Balluff GmbH, Neuhausen (DE)

(72) Inventors: Pascal Gaggero, Sutz (CH); Ellen Wohlfart, Stuttgart (DE); Manuela Schmidt, Filderstadt (DE)

(73) Assignee: Balluff GmbH, Neuhausen (DE)

( * ) Notice: Subject to any disclaimer, the term of this patent is extended or adjusted under 35 U.S.C. 154(b) by 14 days.

(21) Appl. No.: 16/385,273

(22) Filed: Apr. 16, 2019

(65) Prior Publication Data

US 2019/0325731 A1    Oct. 24, 2019

(30) Foreign Application Priority Data

Apr. 18, 2018 (DE) .................. 10 2018 109 267

(51) Int. Cl.

| | |
|---|---|
| *G08B 21/18* | (2006.01) |
| *H02J 50/05* | (2016.01) |
| *H02J 50/10* | (2016.01) |
| *G01P 1/00* | (2006.01) |
| *H04W 84/18* | (2009.01) |
| *F16B 1/00* | (2006.01) |

(52) U.S. Cl.
CPC .............. *G08B 21/182* (2013.01); *G01P 1/00* (2013.01); *H02J 50/05* (2016.02); *H02J 50/10* (2016.02); *F16B 1/00* (2013.01); *F16B 2001/0035* (2013.01); *H04W 84/18* (2013.01)

(58) Field of Classification Search
CPC .. H04B 5/0012; H04B 5/0075; H04B 5/0031; H01R 9/2675; G08C 17/06; H01F 38/14; H01H 2300/03; Y04S 20/14
See application file for complete search history.

(56) References Cited

U.S. PATENT DOCUMENTS

| | | |
|---|---|---|
| 6,476,520 B1 | 11/2002 | Bohm et al. |
| 9,099,880 B2 | 8/2015 | Wesemann et al. |
| 10,127,163 B2 | 11/2018 | Feinaeugle |

(Continued)

FOREIGN PATENT DOCUMENTS

| | | |
|---|---|---|
| DE | 197 19 730 C1 | 10/1998 |
| DE | 10 2009 003 846 A1 | 11/2010 |

(Continued)

OTHER PUBLICATIONS

German Office Action dated Jan. 17, 2019 in German Application No. 10 2018 109 267.9, with English translation of the relevant parts.

(Continued)

*Primary Examiner* — Mirza F Alam
(74) *Attorney, Agent, or Firm* — Collard & Roe, P.C.

(57) ABSTRACT

A fixing element for electrical devices, wherein at least one electrical device can be fixed to the fixing element, has at least one coupler, which forms at least one coupling to the at least one electrical device fixed to the fixing element, via which coupling electrical energy and/or data can be transmitted to the at least one electrical device, wherein the coupling is a capacitive and/or inductive coupling. In addition, equipment includes such a fixing element and a least one electrical device, which is fixed to the electrical element.

32 Claims, 4 Drawing Sheets

(56) References Cited

U.S. PATENT DOCUMENTS

| | | | | |
|---|---|---|---|---|
| 2003/0094855 | A1* | 5/2003 | Lohr | H02J 50/12 |
| | | | | 307/109 |
| 2009/0157937 | A1* | 6/2009 | Kuschke | H04B 5/02 |
| | | | | 710/305 |
| 2015/0248372 | A1* | 9/2015 | Meyer-Graefe | H04B 5/0037 |
| | | | | 710/106 |
| 2018/0182587 | A1* | 6/2018 | Koepf | H01H 50/021 |
| 2020/0161798 | A1* | 5/2020 | Lehmann | H01R 13/518 |

FOREIGN PATENT DOCUMENTS

| | | |
|---|---|---|
| DE | 10 2012 009 494 A1 | 11/2013 |
| DE | 10 2012 110 170 A1 | 5/2014 |
| DE | 20 2015 103 359 U1 | 7/2015 |
| DE | 10 2014 219 572 A1 | 3/2016 |
| EP | 1 885 085 A1 | 2/2008 |

OTHER PUBLICATIONS

IEC 61131-9, Edition 1.0, Sep. 2013, "Programmable controllers—Part 9: Single-drop digital communication interface for small sensors and actuators (SDCI)," total of 576 pages.

\* cited by examiner

FIXING ELEMENT FOR ELECTRICAL DEVICES

CROSS REFERENCE TO RELATED APPLICATIONS

Applicant claims priority under 35 U.S.C. § 119 of German Application No. 10 2018 109 267.9 filed Apr. 18, 2018, the disclosure of which is incorporated by reference.

BACKGROUND OF THE INVENTION

1. Field of the Invention

The present invention relates to a fixing element for electrical devices, in particular sensors and/or actuators, via which fixing element electrical energy and/or data can be transmitted to the electrical device. Furthermore, the present invention relates to an equipment having such a fixing element and at least one electrical device. Such a fixing element can be used, for example, in the field of hygiene.

2. Description of the Related Art

Traditionally, electrical devices are fixed on fixing elements, usually in fixed positions, wherein the electrical devices are arranged at predetermined locations by means of the fixing elements. Rods are used as typical fixing elements, wherein the electrical devices are usually fixed on the rods via mechanical brackets, e.g. clamp brackets, or magnetic brackets. In order to supply the electrical devices with electrical energy and in order to transmit data to the electrical devices or from electrical devices, cable connections or electromechanical contacts are typically used. Here, each electrical device must be fixed separately on the fixing elements during installation, and the cable connection or the electromechanical contact must be attached individually to each electrical device. Furthermore, before the electrical device can be removed, the cable connection or the electromechanical contacting must be released when changing an electrical device for maintenance or when exchanging one electrical device for another. The new electrical device must then be re-fixed and the cable connection or the electromechanical contact must be reattached to the new electrical device.

Along with the large amount of time expenditure when installing, deconstructing and exchanging, the cable connection or the electromechanical contacting limits the available construction space, since cables or electrical lines must always be led to the electrical devices. In particular in the field of hygiene, there is a further disadvantage since contamination can be facilitated as a result of the contact points.

Recently, so-called "IO-link" connections are also used to connect terminals to fieldbus modules. An IO-link refers to a standard for an intelligent sensor/actuator interface, which is standardized as international open standard in the IEC 61131-9 standard. Such an IO-link connection and a method and a control device for operating such a connection is known from DE 10 2012 009 494 A1, for example. As described there, the fieldbus modules assume the role of an IO-link "master". Electrical installations such as sensors, actuators, display apparatus, operating apparatus, as well as drives for machines, can come into consideration as devices.

A wireless IO-link communication network is described in DE 20 2015 103 359 U1, for example. The master and devices used there are enabled for wireless communication and are therein referred to as IO-link wireless modules. In particular, these can be used in the context of radio connections. In order to produce a radio connection between master and slave, the master sends a signal with a preamble, to which the respective slave, i.e. the device, is set.

SUMMARY OF THE INVENTION

A fixing element for electrical devices is proposed, on which at least one electrical device can be fixed. Preferably, the electrical devices can be freely fixed, i.e. not bound to a location or position, to the fixing element, such that their position on the fixing element can be easily changed at any time. The fixing element has at least one coupler, which forms at least one coupling to the at least one electrical device fixed on the fixing element. Via the coupling, either electrical energy can be transferred from at least one coupler to the at least one electrical device or data can be transferred from the at least one coupler to the at least one electrical device and/or from the at least one electrical device to the at least one coupler—thus bidirectionally—or both electrical energy and data can be transferred to the at least one electrical device—the data preferably also bidirectionally from the electrical device to the coupler. The coupling can be implemented as a capacitive coupling or as an inductive coupling or combined in both manners. It is also possible to transfer the electrical energy to be transferred via one of these types of coupling, for example via the inductive coupling, and to transfer the data via the other type of coupling, for example via the capacitive coupling. The type of coupling can be selected by means of the intended use, the exact design of the fixing element, the type and design of the electrical devices used and further circumstances. The coupler is set up to implement the corresponding coupling and has inherently known capacitive and/or inductive transfer devices for the electrical energy and/or inherently known capacitive and/or inductive transfer devices for transferring the data, in particular bidirectionally, to the electrical device. With the inductive coupling, the transfer device is a coil, for example, and, with the capacitive coupling, it is a capacitor (plate).

The fixing element according to the invention offers the advantage that a direct cabling or an electromechanical contact to the at least one electrical device is not necessary. In particular with a multitude of electrical devices, on one hand, this leads to a simplification of the installation, while on the other hand, the number of usually obstructive cables or lines is reduced. At most, a cabling of the fixing element must take place, wherein, to do so, reference is made to versions explained further below. Furthermore, the at least one electrical device can be rearranged quickly and with less effort. In addition, such a fixing element enables a hygienic design, since contact points, for example for cable connections or for electromagnetic contacts, are avoided, on which contamination could form.

The at least one electrical device is preferably a sensor and/or an actuator. The electrical device can also be an electrical apparatus, in particular an optoelectronic apparatus, an acoustic apparatus, an electromagnetic apparatus and/or similar.

Alternatively, the at least one electrical device is an adapter for an electrical apparatus, preferably for a sensor and/or an actuator, yet also, in particular, for an optoelectronic apparatus, for an acoustic apparatus, for an electromechanical apparatus or similar. The adapter has an adapter port, with which the electrical apparatus can be connected and via which electrical energy and/or data can be transmitted to the electrical apparatus and/or from the electrical apparatus. The adapter port is preferably set up for a digital communication with the electrical apparatus, in particular preferably for an IO-link communication with the electrical apparatus. Alternatively, the adapter port can transmit a PNP/NPN/push-pull input/output signal and/or an analogue current/voltage signal. Optionally, a sealing element, for example a sealing ring, can be provided between the adapter and the electrical apparatus around the adapter port. This is advantageous in particular with a use in the field of hygiene since, as a result, contamination can be avoided.

The strength of the described capacitive and/or inductive coupling typically decreases with the distance between the at least one coupler and the at least one electrical device. Depending on the exact formation of the fixing element and the coupler, in particular the coupling strength achieved by the coupler, and the maximum distance between the coupling and the at least one electrical device, in principle one coupler suffices in order to implement the coupling to the at least one electrical device, even when this is fixed freely on the fixing element. Advantageously, the fixing element has a multitude of couplers, which forms at least one coupling with the at least one electrical device. As a result of the multitude of couplers, a larger region is covered, in which the coupling can be implemented.

Alternatively, the coupling surface of the coupling can be enlarged, in order to cover a larger region in which the coupling can be implemented. This can take place by enlarging the transfer device. This can take place in the inductive coupling, for example, by enlarging the coil and in the capacitive coupling), for example, by enlarging the capacitor plate(s.

Preferably, the couplers are arranged on the fixing element one following the other and, in particular, distributed equidistantly across the fixing element, in order to provide a sufficiently high coupling strength for the electrical devices across the entire fixing element or at least one desired region. As a result, it is achieved that the at least one electrical device can be freely fixed on the fixing element without the coupling strength suffering. Furthermore, the couplers can be arranged on a plane, whereby interferences can be reduced with the coupling.

In practice, a multitude of electrical devices is typically used, which are fixed on the same fixing element. Thus, several electrical devices can be coupled simultaneously by the at least one coupler.

If different electrical devices are used, the individual electrical devices are advantageously supplied with the electrical energy required by them, and data can be transmitted according to the specification of the electrical devices. This offers the advantage that a multitude of electrical devices can be fixed on the fixing element quickly and with less effort and can be used.

In order to fix the at least one electrical device, mechanical fixing means and/or magnetic fixing means can be provided, which are suitable for fixing on the fixing element. As an example for mechanical fixing means, clamping brackets are suitable, which are clamped on and/or around the fixing means. Brackets having a magnet serve as magnetic fixing means, wherein the fixing means in this case consists at least partially of a magnetic material.

According to one aspect, the fixing element forms a closed body. Preferably, the at least one electrical device can be fixed on the outside of the closed body forming the fixing element and the at least one coupler is arranged inside the closed body forming the fixing element. The coupling is then implemented through the outer wall of the body, which is achieved by the capacitive and/or inductive coupling. By means of this arrangement, the electrical device can be fixed in a simple manner by the fixing means described above on the outside of the fixing element and, at least at the same time, aligned on the subject to be examined or measuring region. In addition, the at least one coupler does not take up any space on the outside of the fixing element. Furthermore, the supply of the at least one coupler can also be guided inside the fixing element, in particular when the supply is inherently cable-bound. This leads to the at least one electrical device being able to be freely fixed on the outside of the fixing element without the positioning being limited by the coupler or a cabling.

Purely in principle, the fixing element can be formed in practically any form; particularly advantageously, the fixing element has the shape of a rod, in particular a cylindrical rod. The cylindrical rod has the advantage that it is formed rotationally symmetrically in terms of its longitudinal axis (central axis), such that the at least one electrical device can be fixed in its preferred arrangement in a simple manner on the lateral surface of the rod and can be arranged in any orientation. In addition, fixing means for rods are known in many variations, wherein the clamping brackets already mentioned and the magnetic brackets already mentioned are preferred. It can be provided that the clamping brackets can enclose the complete periphery of the rods. Purely in principle, the at least one coupler can also be formed on the rod, for example opposite an electrical device in each case. However, the at least one coupler is preferably arranged inside the rod with regards to what has been described above. Several couplers can then preferably be arranged one following the other equidistantly in the longitudinal direction of the rod, such that the at least one electrical device can be positioned arbitrarily on the lateral surface. The coupling between the at least one coupler and the at least one electrical device takes place substantially in the radial direction in relation to the rod, wherein the coupling can also have an axial part.

Purely in principle, the fixing elements can be formed depending on the position of the object or measuring region to be examined, the surroundings, further components, and further situations, which prevail in practice.

In the case of a rod, it can be provided that the rod is curved. The rod can be bent or angled once or multiple times, and can in particular form a U-shape. With regards to what has been described above, it is particularly advantageous when the central axis of the rod furthermore runs on a plane after the bending and the couplers are arranged one behind the other along the (curved) central axis.

For simple implementation, the at least one coupler is formed on a board (circuit board), which is part of the fixing element and is arranged, in particular, inside the fixing element. Preferably, components of the at least one coupler, in particular the transfer devices mentioned above, are implemented by means of conductor tracks on the board.

Optionally, the rod can be flexible or bendable—similar to a hose. In this case, the board can be formed as a flexible circuit board. To produce the flexible circuit board, a flexible base material, such as FlexPrint, for example, can be used.

To control the at least one coupler, a signal preparation device is preferably provided, which is formed to feed the at least one coupler. Preferably, the signal preparation device is implemented inside the fixing element, in particular on the board.

The signal preparation device is preferably connected to all couplers. According to one aspect, a switch is allocated to each coupler, which can produce or detach a connection, in particular a line, between the respective coupler and the signal preparation device. Preferably, each of the switches is arranged and formed in such a way that it can produce or detach the respective connection between the signal preparation device and the allocated coupler and irrespective of the other connections to the further couplers. The switches themselves can also be controlled via the signal preparation device. Preferably, the switches are wired parallel to a current-feed line.

According to a further aspect, a separate line for the connection of the coupler to the signal preparation device is allocated to each coupler. The signal preparation device can then feed the individual couplers via the respective line. With the two ways described, it is possible to separately feed each coupler to the signal preparation device.

During use, it can be desired to determine the number and the position of the electrical devices fixed to the fixing element and to correspondingly adjust the controller. The signal preparation device can then be accordingly set up to determine the number and/or position of the at least one electrical device fixed on the fixing element by means of the capacitive and/or inductive coupling. Conclusions about the number of electrical devices connected to the respective coupler can be made directly from the capacitive and/or inductive coupling. Depending on which coupler enters a coupling, conclusions about the position of the at least one electrical device can then be made.

Alternatively, the signal preparation device can be set up to determine the number and/or the position of the at least one electrical device fixed on the fixing element by means of a measurement of the current flow through the coupler. When a coupler enters a coupling, the current flow is changed by this coupler. Analogously, depending on which coupler enters a coupling, conclusions can be made about the position of the at least one electrical device. From the current drain of the coupled coupler, the number of the electrical devices can be concluded, since each electrical device has a current need corresponding to its specification, which is covered, as described, by the coupler. As a result, the current drain of the fixing element can be reduced and the self-warming of the fixing element can be kept low.

Furthermore, the signal preparation device can be set up to find a contamination which has collected on the fixing element by means of the capacitive and/or inductive coupling. The contamination reduces the coupling strength, such that this can be used as a measure for the contamination.

In order to achieve an optimum result when examining, it is desirable, at least with electrical devices that are designed for stationary operation, that their position and orientation is not changed. On or in the fixing element, an acceleration sensor and/or a gyroscope can accordingly be provided, which registers positional changes of the fixing element and/or the at least one electrical device. Depending on the formation of the fixing element, e.g. when it is formed in the shape of a rod, a positional change of the electrical device often can also be associated with a change of the orientation. Preferably, an alarm signal can then be emitted when the positional change of the fixing element and/or the at least one electrical device exceeds a predeterminable threshold value in order to signal that the position of the fixing element and/or the at least one electrical device and/or the orientation of the at least one electrical device has changed significantly.

Moreover, a temperature sensor can be provided on or in the fixing element, which measures the temperature of the fixing element and/or the at least one electrical device. The temperature can influence the at least one electrical device or lead to damages of components of the fixing element and/or the electrical device. Preferably, an alarm signal can then be emitted when the temperature of the fixing element and/or the at least one electrical device exceeds a predeterminable threshold value.

The at least one electrical device requires electrical energy that is set to its specifications. Similarly, couplers can only transfer electrical energy within their specifications. Thus, it is important to regulate the voltage in such a way that it can be transferred by the at least one coupler and can be used by the at least one electrical device. Typically, such electrical devices operate with DC voltage. Accordingly, a voltage transducer and a commutator are provided on or in the fixing element, which is set up to regulate the voltage of the supplied electrical energy down to a useable voltage and commutate this. The sequence in which the voltage is down-regulated and commutated can be set depending on the use, by the voltage transducer and the commutator acting on the voltage of the supplied electrical energy in the desired sequence.

According to one aspect, a port is provided on the fixing element, which serves as the interface and, on one hand, obtains electrical energy via the fixing element. On the other hand, a port can be provided which has a digital communication function, via which data can be provided to the fixing element and, in particular, to the at least one coupler. Preferably, such a port is set up for a wireless communication. The port is preferably set up for a wire-connected IO-link communication or for a wireless IO-link communication. Optionally, the two functions mentioned above, the feeding of electrical energy and the feeding of data via a single port or via separate ports, can be implemented. The at least one port is provided as an interface to the fixing element and can provide, in particular, an interface to components arranged inside the fixing element, above all to the signal preparation device described above. At least one of the parameters described above is read via the port:

the number and/or the position of the at least one electrical device;

the positional changes of the fixing element and/or the at least one electrical device; and/or the temperature of the fixing element and/or the at least one electrical device.

Furthermore, the invention relates to equipment, which comprises a fixing element described above and at least one electrical device, which is fixed on the fixing element. The advantages and developments described in connection with the fixing element can be assumed for the equipment.

In a preferred embodiment, the electromagnetic coupling surface of the at least one electrical device is at least as large as the diameter of each of the couplers. As a result, a secure coupling between the at least one electrical device and the at least one coupler is achieved.

Moreover, a base station can be provided which is set up to implement a wireless communication with the at least one electrical device, which is preferably formed as a wireless IO-link communication. To operate the base station, these can either be connected to an automation system or to a data processor. In this case, the electrical energy is furthermore transmitted via the at least one coupler to the at least one electrical device while data is preferably transmitted via the wireless communication—above all via the wireless IO-link communication—between the at least one electrical device and the base station. Similarly, the at least one coupler and/or the signal preparation device can communicate digitally via the port.

Moreover, an alarm device can be provided, which emits an alarm signal, when a positional change of the fixing element and/or the at least one electrical devices exceeds an allocated threshold value and/or the temperature of the fixing element and/or the at least one electrical devices exceeds an allocated threshold value. In terms of the individual factors and their effect, reference is made to the description above in the context of the fixing element. The alarm signal is then preferably emitted via the port.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
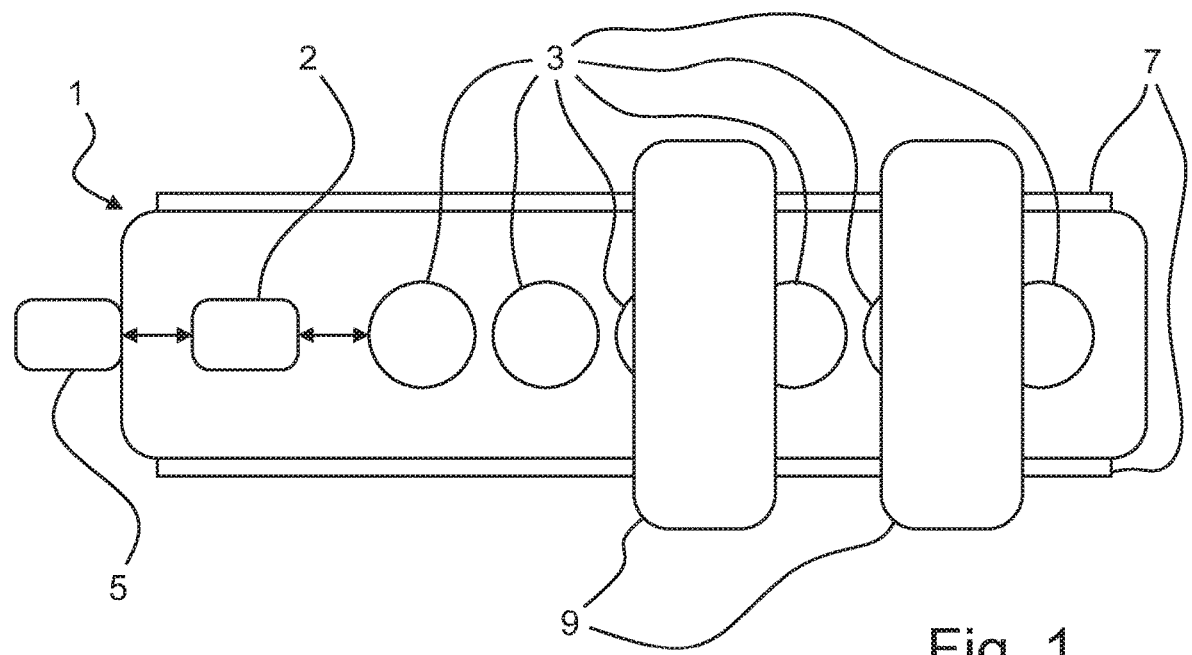
FIG. 1 shows a schematic depiction of the equipment according to the invention having a first embodiment of the fixing element according to the invention for sensors in the form of a straight rod having two sensors.

FIG. 1 shows a schematic depiction of the equipment according to the invention having a first embodiment of the fixing element 1 according to the invention for sensors 9 in the form of a straight, cylindrical rod and two sensors 9, which are fixed on a fixing portion 7 on the outside, more exactly on the lateral surface, of the fixing element 1, by means of a fixing means, for example a mechanical clamping element or a magnetic holding element, which is not shown here in more detail. The sensors 9 can be arranged in any position and in any orientation on the lateral surface of the fixing element 1. The fixing element has six electromagnetic couplers 3 in its inside, which are arranged equidistantly one following the other in a row along the axial direction, i.e. the central axis. The couplers 3 are formed on a board not shown here in more detail, which is part of the fixing element 1 and is arranged inside the fixing element 1, wherein components of the couplers 3 are implemented by means of conductor tracks on the board. The couplers 3 are set up to create a capacitive and/or an inductive coupling to at least one of the sensors 9, preferably to both sensors 9 (and, as the case may be, further sensors not shown here). The coupling between the couplers 3 and the sensors 9 takes place substantially in a radial direction in relation to the rod-shaped fixing element 1 with an axial part for couplers, in whose position a sensor 9 is not directly fixed, and runs from the inside of the fixing element 1 through the fixing portion 7 to the sensors 9. The electromagnetic coupling surface of each sensor 9 is at least as large as the diameter of each of the couplers 3. In this embodiment, electrical energy is transmitted from the couplers 3 to the sensors 9 and data is transmitted bidirectionally from the coupler 3 to the sensors 9 and from the sensors 9 to the couplers 3 via the coupling.

The couplers 3 are all connected to a signal preparation device 2, which is also arranged inside the fixing element 1. For a detailed description of the connection, reference is made to the embodiments below. The signal preparation device 2 is set up to feed the couplers 3 with electrical energy and data. In addition, the signal preparation device 2 is set up to detect the strength of the capacitive and/or inductive coupling. The signal processing device 2 can determine the number and/or the position of the sensors 9 fixed on the fixing element 1 by means of the capacitive and/or inductive coupling. Alternatively or additionally, the signal preparation device 2 can also use a measurement of the current flow through the couplers 3 for this. Finally, the signal processing device 2 controls the feed of the individual couplers 3 according to the number and/or the position of the sensors 9. In addition, the strength of the capacitive and/or inductive coupling serves as a measure for a contamination of the fixing element 1, which the signal preparation device 2 can find in this way.

The fixing element 1 has a port 5, which is connected to the signal processing device 2. In this embodiment, the port 5 is set up as an interface both for transferring the electrical energy to the signal preparation device 2 or to the couplers 3 and for a digital communication, via which data are transmitted to the signal preparation device 2 or to the couplers 3 and/or from the signal preparation device 2 or to the couplers 3. In a preferred embodiment, the port 5 is set up for a wire-connected IO-link communication or a wireless IO-link communication.

Not depicted here, an acceleration sensor and/or a gyroscope, which register positional changes of the fixing element 1 and/or the sensors 9, and a temperature sensor, which measures the temperature of the fixing element 1 and/or the sensors 9, can be provided. The number and/or the position of the sensors 9, which can be determined by the signal preparation device 2, the positional change(s) registered by the acceleration sensor and/or by the gyroscope and the temperature(s) measured by the temperature sensor can be read via the port 5.

The positional change(s) registered by the acceleration sensor and/or by the gyroscope and the temperature(s) measured by the temperature sensor are forwarded to an alarm device, which, in this exemplary embodiment, is part of the signal preparation device 2 and is not depicted separately. There, the positional change of the fixing element 1 is compared to a threshold value for the positional change of the fixing element 1 or the positional change of the sensors 9 to a threshold value for the positional change of the sensors 9, wherein the threshold values for the positional change reflect a situation in which the sensors 9 detect a substantially changed measuring region and/or the stability of the device is impeded. Similarly, the temperature of the fixing element 1 is compared to a threshold value for the temperature of the fixing element 1 and the temperature of the sensors is compared to a threshold value for the temperature of the sensors 9, wherein the threshold values for the temperature represent a critical temperature, at which the sensors 9 are not completely functionable and/or the sensors 9 or the fixing element 1 can be damaged. When one of said threshold values is exceeded, the alarm device emits an alarm signal, which can be read via the port 5.

In the further figures, the same components are provided with the same reference numerals as in FIG. 1, for whose description reference is made to the description above.

Figure 2:
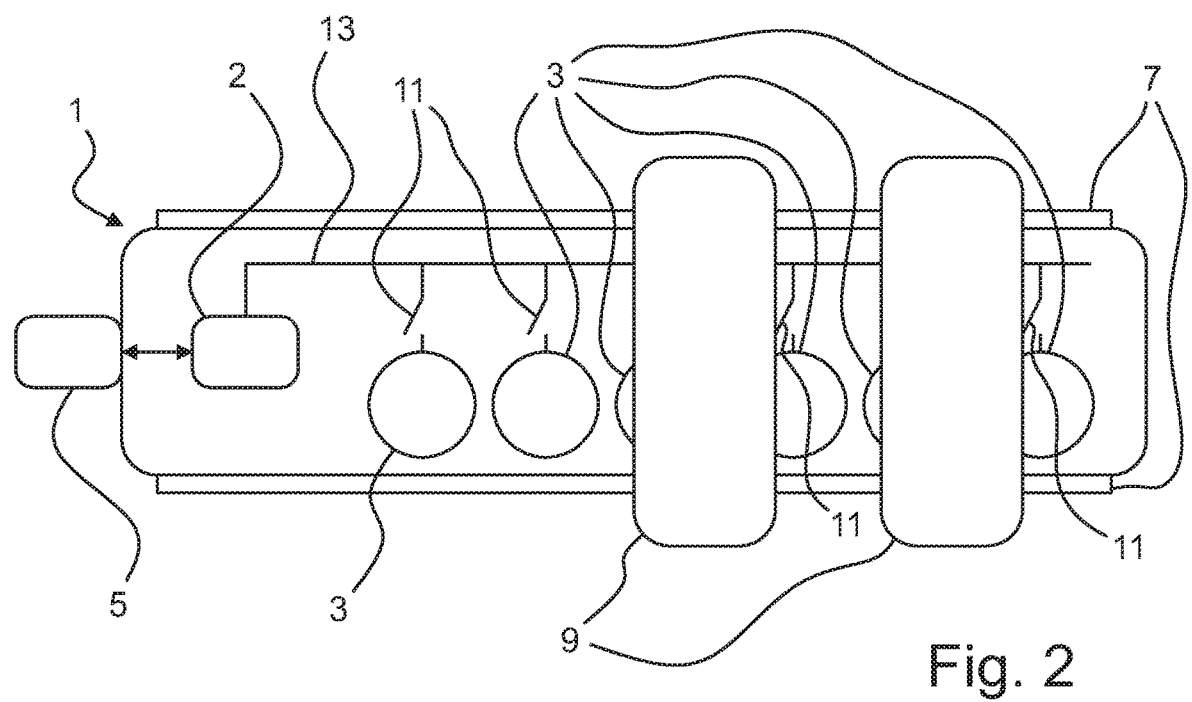
FIG. 2 shows a schematic depiction of the equipment according to the invention having a second embodiment of the fixing element according to the invention for sensors in the form of a straight rod having two sensors.
Figure 3:
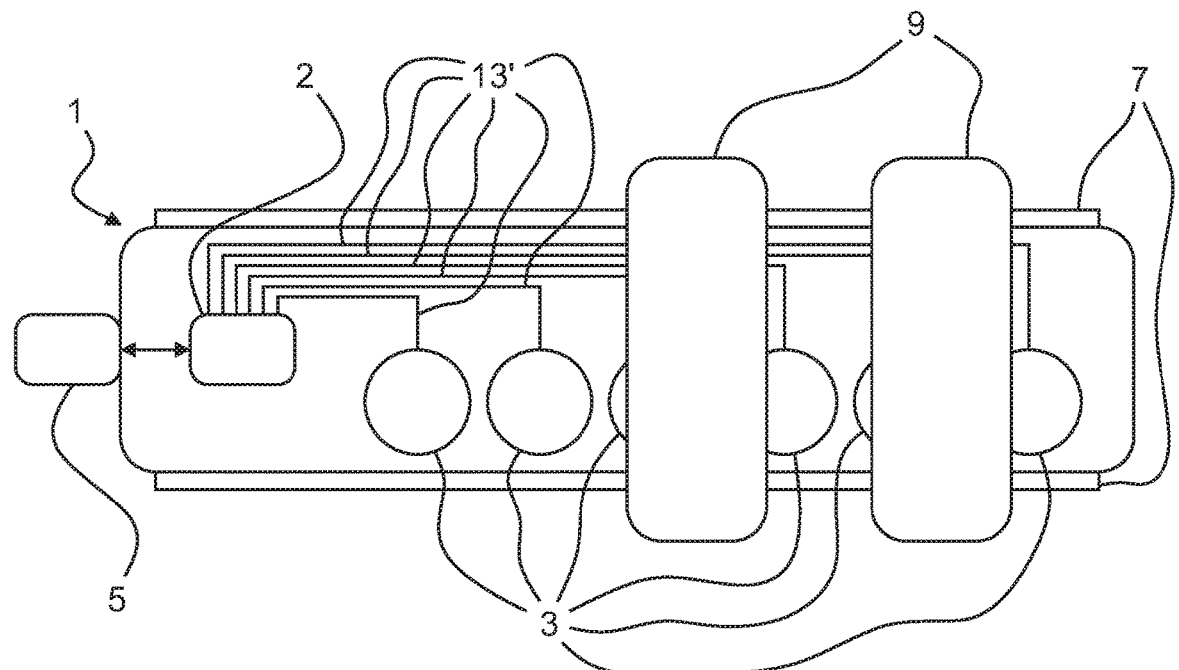
FIG. 3 shows a schematic depiction of the equipment according to the invention having a third embodiment of the fixing element according to the invention for sensors in the form of a straight rod having two sensors.

FIGS. 2 and 3 show schematic depictions of a second and a third embodiment of the fixing element 1 according to the invention, in which the connection of the signal processing device 2 already described in connection with the first embodiment and FIG. 1 and the couplers 3 is presented in detail. In the second exemplary embodiment, an electrical line 13 departing from the signal preparation device 2 is provided, which branches to each coupler 3. The couplers 3 are fed with electrical energy and data from the signal preparation device 2 via the electrical line 13 formed as a data line. In addition, switches 11 are provided between the line 13 and each of the couplers 3, which are set up to interrupt and produce the connection between the allocated coupler 3 and the signal preparation device 2. The switches 11 are switched in parallel to the line 13 and can be controlled individually via the signal preparation device 2. FIG. 3, in contrast, shows a plurality of electrical lines 13', which connect each of the couplers 3 separately to the signal processing device 2. Here, the electrical lines 13' are also formed as data lines. The signal preparation device 2 is set up to feed each of the couplers 3 independently with electrical energy and data via the line 13' allocated to it.

Figure 4:
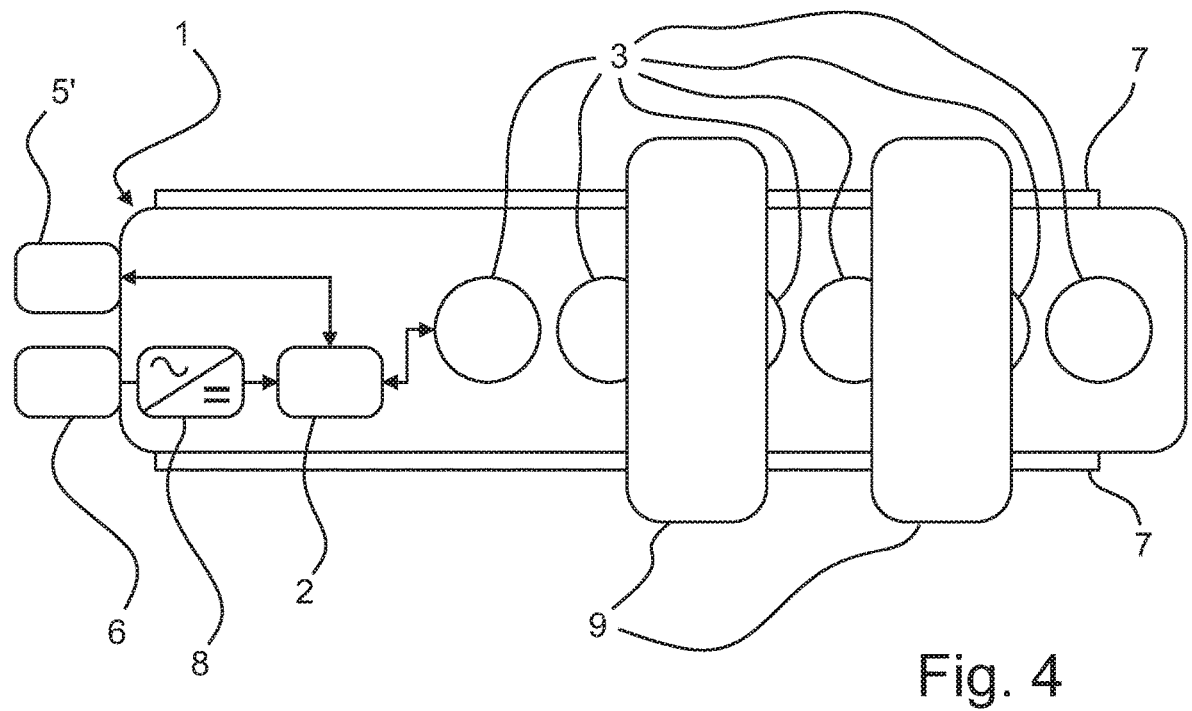
FIG. 4 shows a schematic depiction of the equipment according to the invention having a fourth embodiment of the fixing element according to the invention for sensors in the form of a straight rod having two sensors.

FIG. 4 shows a schematic depiction of a fourth embodiment of the fixing element 1 according to the invention. Instead of a single port 5, via which both electrical energy and data are transmitted, the fixing element 1 comprises two ports 5', 6. The one port 5' still has the digital communication function already described in the context of the first embodiment and FIG. 1—in particular formed as a wireless IO-link communication—and transmits the data to the signal preparation device 2, wherein, in this exemplary embodiment, it does not transmit any electrical energy, in contrast to port 5 described above. The electrical energy is transferred via a second port 6, which, on the contrary, does not have any communication function, to a combined voltage transducer and commutator 8. The combined voltage transducer and commutator 8 regulates the input voltage of the supplied electrical energy, often 220V, down to a voltage of 24V—this corresponds to the IO-link specification—and then converts this into a DC voltage. The DC voltage is then forwarded to the signal preparation device 2 and can then be transferred by the couplers 3 and finally used by the sensors 9. As a result, the equipment according to the invention thus has an integrated industrial current supply.

Figure 5:
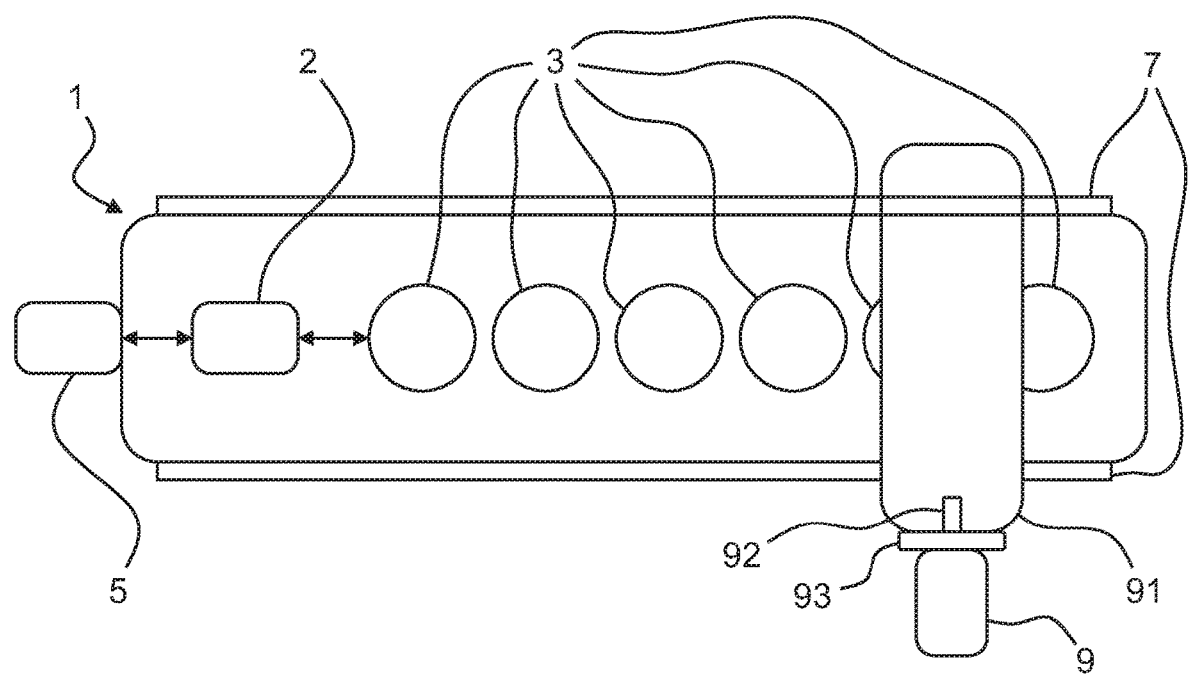
FIG. 5 shows a schematic depiction of the equipment according to the invention having a fifth embodiment of the fixing element according to the invention for sensors in the form of a straight rod having an adapter.

FIG. 5 shows a schematic depiction of a fifth embodiment of the fixing element 1 according to the invention having an adapter 91, which is connected to a sensor 9. The adapter 91 is fixed to a fixing portion 7 on the outside, more exactly on the lateral surface, of the fixing element 1 by means of a fixing means not depicted in more detail here, for example a mechanical clamping element or a magnetic holding element. The adapter 91 has an adapter port 92, via which the sensor 9 is connected to the adapter 91. In this embodiment, the adapter port 92 is set up as an interface both for transmitting the electrical energy to the sensor and for a digital communication, via which data are transferred to the sensor 9 or from the sensor 9. In a preferred embodiment, the port 5 is set up for an IO-link communication. Furthermore, a sealing ring 93 is provided, which is arranged between the adapter 91 and the sensor 9 and lies around the adapter port 92, whereby it seals the connection point between the adapter 91 and the sensor 9. The adapter 91 described in this embodiment can be used in each of the other embodiments in the manner described.

Figure 6:
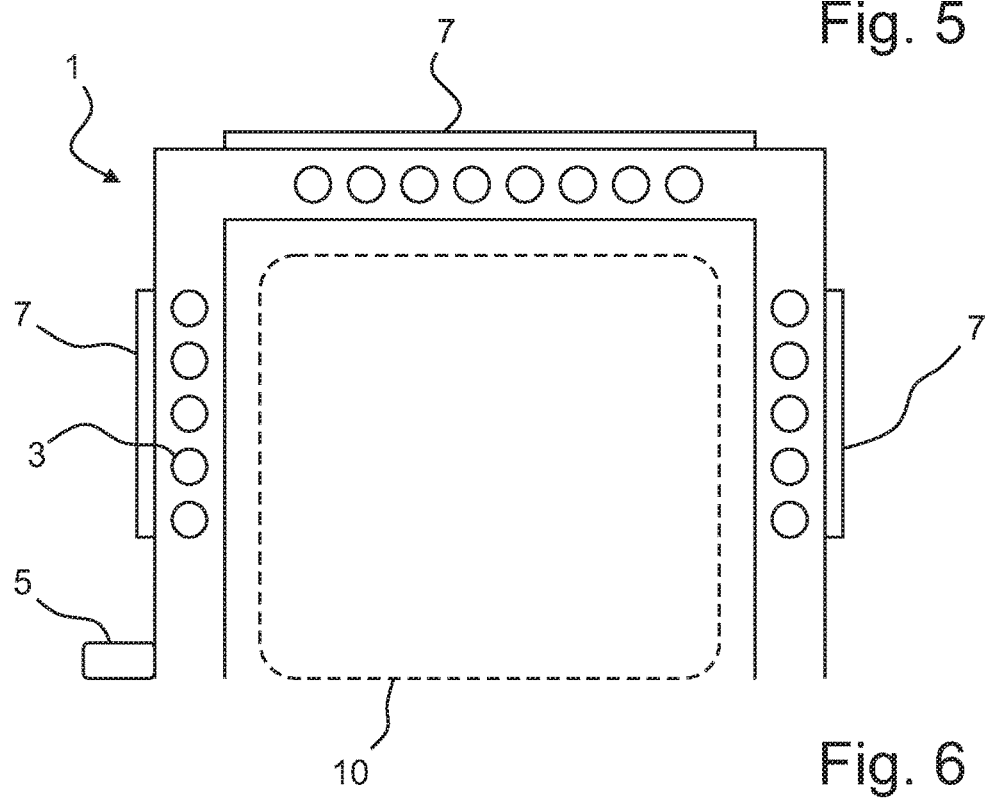
FIG. 6 shows a schematic depiction of the equipment according to the invention having a sixth embodiment of the fixing element according to the invention for sensors in the form of a rod bent twice.

FIG. 6 shows a schematic depiction of a sixth embodiment of the fixing element 1 according to the invention, which is formed as a rod bent twice, wherein both of the bends are formed in such a way that the central axis of the bent rod further lies on a plane. The features of the components described above can be assumed for this embodiment. Here, the board not shown can be formed as a flexible circuit board having FlexPrret as a flexible base material. Because of the twice curved, planar design of the fixing element 1, a region enclosed in a U-shape is formed, in which the measuring region 10 of the sensors 9 not depicted here is arranged. Furthermore, the couplers 3 are arranged one following the other along the curved central axis of the bent rod and are arranged on a plane.

Figure 7:
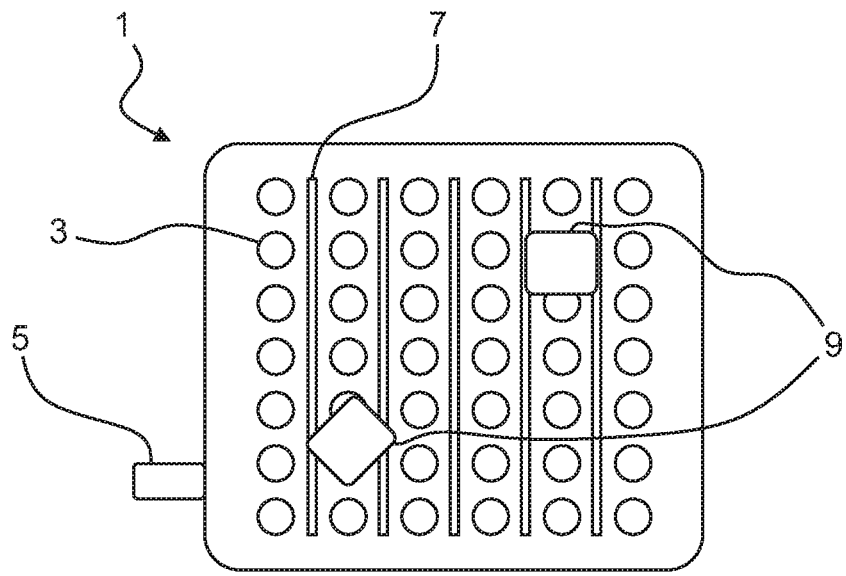
FIG. 7 shows schematic depiction of the equipment according to the invention having a seventh embodiment of the fixing element according to the invention for sensors in planar form having two sensors.

FIG. 7 shows a schematic depiction of a seventh embodiment of the fixing element 1 according to the invention, which is formed in a planar design. In other words, the fixing element 1 is formed as a flat, planar object, which extends predominantly on a surface in a plane, i.e. formed as a plate. The couplers 3 form an array and are arranged in the surface in the shape of a matrix in columns and rows with equal spacing, wherein all couplers 3 lie on a plane. Fixing portions 7 are arranged between the columns or the rows, on which fixing portions the sensors 9 are arranged on the surface of the fixing element 1 by means of a fixing means not shown here in more detail, for example a mechanical holding element or a magnetic holding element. The sensors 9 can be arranged arbitrarily freely on the surface of the fixing element 1.

Figure 8:
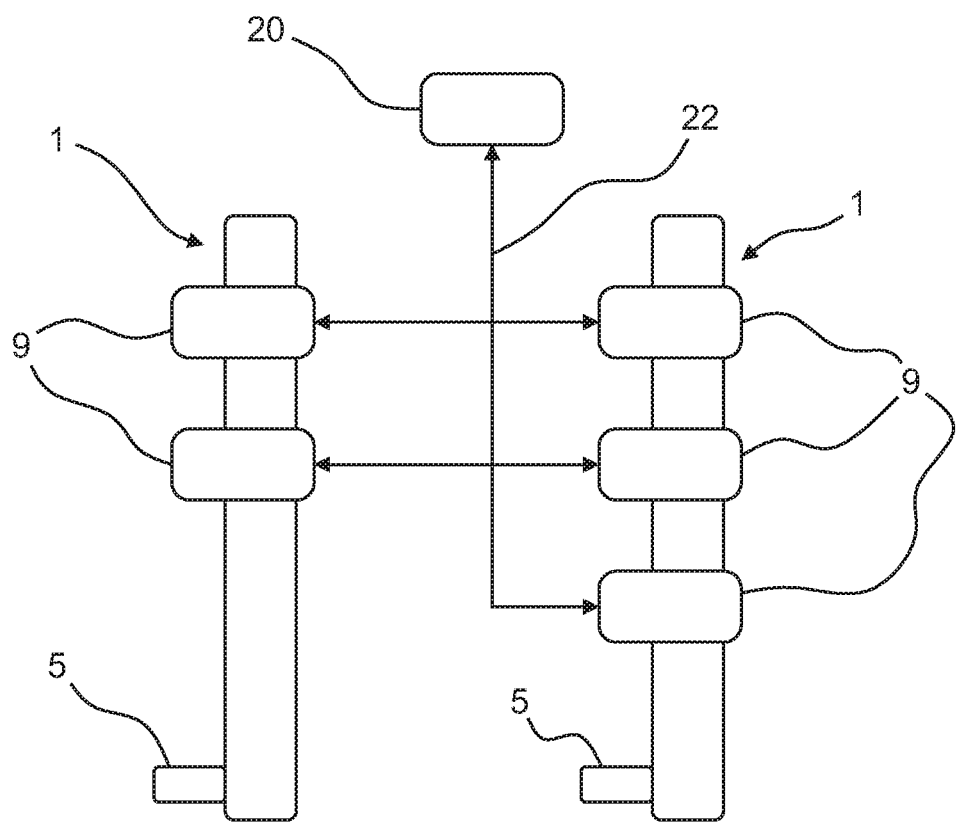
FIG. 8 shows a schematic depiction of two equipments according to the invention according to FIG. 1 and five sensors, which are connected to a base station.

FIG. 8 shows two equipments according to the invention, each having a fixing element 1 according to the first embodiment. With regards to the fixing elements 1, reference is made to the description above. In total, five sensors 9 are fixed on the outside of the two fixing elements 1. Furthermore, a base station 20 is provided, which implements a wireless IO-link communication 22 to the sensors 9. In this exemplary embodiment, the wireless IO-link communication 22 between the base station 20 and all sensors 9 takes place. However, the IO-link communication 22 can also only be formed with defined sensors 9, for example only with those which are also set up for the IO-link communication 22. Even if this exemplary embodiment shows two equipments according to the invention and a base station 20, the IO-link communication 22 can also be implemented with sensors 9 of a single equipment or with sensors 9 of a plurality of equipments. Moreover, in further exemplary embodiments, several base stations 20 can be provided, which are connected to the sensors 9, wherein each sensor 9 is preferably connected to only one base station 20. The base station 22 is connected to an automation system not shown. Then, data is transferred via the IO-link communication 22 to the sensors 9 and from the sensors 9. At the same time, electrical energy is transmitted to the sensors via the port 5 and the couplers 3 not shown here, as depicted above. In addition, further data can be transmitted via the port 5. For example, the above belong to this, which relate to the signal preparation device 2, the movement sensor and/or the gyroscope and/or the temperature.

Equipments described above are used in the field of hygiene, for example.

Although only a few embodiments of the present invention have been shown and described, it is to be understood that many changes and modifications may be made thereunto without departing from the spirit and scope of the invention.

What is claimed is:

1. A fixing element for electrical devices, wherein at least one electrical device is fixed on the fixing element,
wherein the fixing element has at least one coupler, which forms at least one coupling to the at least one electrical device fixed on the fixing element, via which coupling electrical energy and/or data is transmitted to the electrical device, wherein the coupling is a capacitive and/or inductive coupling;
wherein the fixing element forms a closed body, the at least one electrical device is fixed on an outside portion of the fixing element and the at least one coupler is arranged inside the fixing element; and
wherein the fixing element comprises a rod having a lateral surface, wherein the at least one electrical device is fixed on the lateral surface, and the coupling between the at least one coupler and the at least one electrical device takes place in a radial direction in relation to the rod.

2. The fixing element according to claim 1, wherein the at least one electrical device is an electrical apparatus.

3. The fixing element according to claim 1, wherein the at least one electrical device is an adapter for an electrical apparatus, which adapter has an adapter port, to which the electrical apparatus is connected and via which electrical energy and/or data is transmitted to the electrical apparatus and/or from the electrical apparatus.

4. The fixing element according to claim 2, wherein the electrical apparatus is a sensor and/or an actuator.

5. The fixing element according to claim 1, wherein, additionally, data is transmitted from the at least one electrical device to the at least one coupler via the coupling.

6. The fixing element according to claim 1, wherein the fixing element has a plurality of couplers, which forms at least one coupling to the at least one electrical device.

7. The fixing element according to claim 1, wherein the at least one coupler has a coupling surface enlarged by a transmission device of the at least one coupler having larger dimensions.

8. The fixing element according to claim 1, wherein several electrical devices are simultaneously coupled by the at least one coupler.

9. The fixing element according to claim 1, wherein the rod is curved.

10. The fixing element according to claim 1, wherein the rod is flexible.

11. The fixing element according to claim 1, wherein a plurality of couplers are arranged one following the other on the fixing element.

12. The fixing element according to claim 1, wherein a plurality of couplers are arranged on a plane inside the fixing element.

13. The fixing element according to claim 1, wherein the at least one coupler is formed on a board which is part of the fixing element.

14. The fixing element according to claim 13, wherein components of the at least one coupler comprise conductor tracks on the board.

15. The fixing element according to claim 1, further comprising a signal preparation device, which is formed to feed the at least one coupler.

16. The fixing element according to claim 15, wherein a switch is allocated to each coupler for connecting the coupler to the signal preparation device.

17. The fixing element according to claim 15, wherein a separate line is allocated to each coupler for connecting the coupler to the signal preparation device.

18. The fixing element according to claim 15, wherein the signal preparation device is set up to determine a number and/or a position of the electrical devices fixed on the fixing element by the capacitive and/or inductive coupling or by a measurement of the current flow through the couplers and to control the feed of the individual couplers corresponding to the number and/or the position of the electrical devices.

19. The fixing element according to claim 15, wherein the signal preparation device is set up to determine a contamination of the fixing element by the capacitive and/or inductive coupling.

20. The fixing element according to claim 1, further comprising an acceleration sensor and/or a gyroscope, which registers positional changes of the fixing element and/or the at least one electrical device.

21. The fixing element according to claim 1, further comprising a temperature sensor, which measures a temperature of the fixing element and/or the electrical device.

22. The fixing element according to claim 1, further comprising a voltage transducer and a commutator, which are set up to regulate down and commutate the voltage of the supplied electrical energy to a voltage which is transferred from the at least one coupler and is used by the at least one electrical device.

23. The fixing element according to claim 1, further comprising at least one port, via which the fixing element obtains electrical energy.

24. The fixing element according to claim 18, further comprising at least one port, which has more than one digital communication function.

25. The fixing element according to claim 24, wherein the at least one port is set up for a wireless communication.

26. The fixing element according to claim 24, wherein the at least one port is set up for a wire-connected IO-link communication or for a wireless IO-link communication.

27. The fixing element according to claim 24, wherein the number and/or the position of the electrical device, positional changes of the fixing element and/or the electrical devices, and/or the temperature of the fixing element and/or the electrical devices is read via the port.

28. The fixing element according to claim 1, further comprising a mechanical and/or magnetic fastener fixing the at least one electrical device to the fixing element.

29. The equipment comprising a fixing element according to claim 1 and at least one electrical device, which is fixed to the fixing element.

30. The equipment according to claim 29, further comprising a base station, which is set up to implement a wireless communication with between the base station and the at least one electrical device.

31. The equipment according to claim 30, wherein the wireless communication between the base station and the at least one electrical device is a wireless IO-link communication.

32. The equipment according to claim 29, further comprising an alarm device, which emits an alarm signal, when a positional change of the fixing element and/or the at least one electrical device exceeds an allocated threshold value, and/or a temperature of the fixing element and/or the at least one electrical device exceeds an allocated threshold value.

* * * * *